(12) United States Patent
Butera (10) Patent No.: US 9,694,884 B2
(45) Date of Patent: Jul. 4, 2017

(54) BUOYANCY COMPENSATOR DEVICE AND RELATED OVERPRESSURE OR RELIEF VALVE

(71) Applicant: DOLPHIN FLUIDICS S.R.L., Corsico (IT)

(72) Inventor: Francesco Butera, Arese (IT)

(73) Assignee: DOLPHIN FLUIDICS S.R.L., Corsico (MI) (IT)

( * ) Notice: Subject to any disclaimer, the term of this patent is extended or adjusted under 35 U.S.C. 154(b) by 0 days.

(21) Appl. No.: 15/044,377

(22) Filed: Feb. 16, 2016

(65) Prior Publication Data

US 2016/0244133 A1 Aug. 25, 2016

(30) Foreign Application Priority Data

Feb. 19, 2015 (IT) ................................ MI2015A0244

(51) Int. Cl.
*B63C 11/08* (2006.01)
*F16K 15/02* (2006.01)
*F16K 17/02* (2006.01)
*F16K 31/02* (2006.01)

(52) U.S. Cl.
CPC ............ *B63C 11/08* (2013.01); *F16K 15/028* (2013.01); *F16K 17/02* (2013.01); *F16K 31/02* (2013.01); *B63C 2011/085* (2013.01)

(58) Field of Classification Search
USPC ........................................................ 405/186
See application file for complete search history.

(56) References Cited

U.S. PATENT DOCUMENTS

| 5,482,405 A | * | 1/1996 | Tolksdorf | B63C 11/08 |
| | | | | 405/185 |
| 5,505,559 A | * | 4/1996 | Hermansen | B63C 11/08 |
| | | | | 137/505.11 |
| 5,735,504 A | | 4/1998 | Walters | |
| 2013/0255807 A1 | | 10/2013 | Bonzon et al. | |
| 2015/0107688 A1 | * | 4/2015 | Deas | B63C 11/08 |
| | | | | 137/199 |

FOREIGN PATENT DOCUMENTS

WO 2013178264 A1 12/2013

* cited by examiner

*Primary Examiner* — Kyle Armstrong
(74) *Attorney, Agent, or Firm* — King & Schickli, PLLC (57) ABSTRACT

An overpressure or relief valve (30) for a buoyancy compensator device (10) for underwater use of the type comprising an expandable bag (12) internally provided with at least one air chamber is disclosed. The valve (30) comprising at least one mobile shutter element (32) configured to occlude at least one corresponding hole (62) formed on an abutment plate (46) that is configured to be applied on a wall of the air chamber. The mobile shutter element (32) being operatively connected to a first end of an elastic element (34), whereas a second end of said elastic element (34) is in turn operatively connected to an electric actuator element (36), actuated by an electrical current and configured to counteract, in certain operating conditions of the valve (30), the elastic force of the elastic element (34), so as to perform the selective opening and closing of the mobile shutter element (32) and, consequently, respectively allowing or preventing air from the hole (62), and then from the inside of the air chamber, from passing towards one or more through holes (58) formed on the outer body (60) of the valve (30) and vice versa.

11 Claims, 7 Drawing Sheets

PRIOR ART

BUOYANCY COMPENSATOR DEVICE AND RELATED OVERPRESSURE OR RELIEF VALVE

The present invention relates to a buoyancy compensator device for underwater use and, in particular, to an overpressure or relief valve for such buoyancy compensator device.

A buoyancy compensator device, or otherwise referred to as stabilizer jacket, is an equipment used for underwater dives in order to increase the ability to control the depth level to be maintained underwater, allowing the diver to reach both a stable swimming position and a constant depth. The buoyancy compensator device may also be used for diving or emerging in a controlled manner.

The buoyancy compensator device operates according to the principle of the fishes' air bladder. In fact, this device consists of a jacket-shaped expandable bag manufactured with a synthetic material. The bag is internally provided with at least one air bladder or air chamber in which the air is pumped, with the possibility of being released by means of relief valves or an appropriate corrugated tube. The air pumped into the air chamber, deriving from a low pressure outlet of an oxygen tank or possibly breathed by the diver through the corrugated tube, it is previously compressed air that then arrives into said air chamber, so causing an increase in the volume thereof. The increase in the volume of the air chamber, or the decrease of such volume obtained by acting on the relief valves of the device, allows modifying the mass/volume ratio of the diver and therefore produces an effect on the buoyancy force and on the swimming position of the diver himself. As said volume increases, on the assumption of the same hydrostatic pressure, increases in fact the weight of the amount of water displaced and so the diver receives a positive push upward.

The ordinary swimming position of the diver is generally neutral but, as depth increases, said position becomes negative as a result of both the compression exerted by the diving suit and of the air spaces of the diver himself caused by an increase in the hydrostatic pressure. As a consequence, the air increase into the air chamber of the buoyancy compensator device serves to oppose such negative push, restoring the neutral position. The opposite happens during the ascent: as a result of the decrease in the hydrostatic pressure, the air contained in the air chamber expands, giving the diver a more and more positive push that may cause his fast and dangerous ascent to the surface. It appears therefore necessary to let the air out from said air chamber through the appropriate relief valves.

Appropriately dosing the air quantity to be pumped into the air chamber, that expands and increases its own volume, a neutral position (hydrostatic equilibrium) may be achieved, and thanks to this latter, the diver does not receive neither push upward (surfacing) nor push downward (sinking), as he is able to maintain the level he reached without any effort. During the ascent, the decrease of the outside pressure causes an increasing expansion of the air contained into the air chamber. As a consequence, if appropriate action on the relief valves were not undertaken to remove excess air from the air chamber, the ascent could prove extremely dangerous (the so-called "blow-up"), with an excessive speed that may cause accidents of both lung overpressure and embolisms due to the failure of decompressions.

A typical buoyancy compensator device, manufactured in the jacket-shaped form, is generally provided with the following main components:

- a low pressure hose, capable of bringing gas (air) from the tanks to the jacket regulator;
- an inflation valve, capable of bringing gas from the hose to the jacket air chamber;
- one or more overpressure or relief valves that, in case of excessive pressure into the air chamber, allow to empty the air chamber itself;
- some hook-and-loop fasteners that allow the diver to wear the jacket in a stable manner;
- a plate, made of plastic or metal and referred to as "back plate", whose function is to support tasks;
- a system provided with weights, and sometimes equipped with a mechanism allowing quick release.

Figure 2:
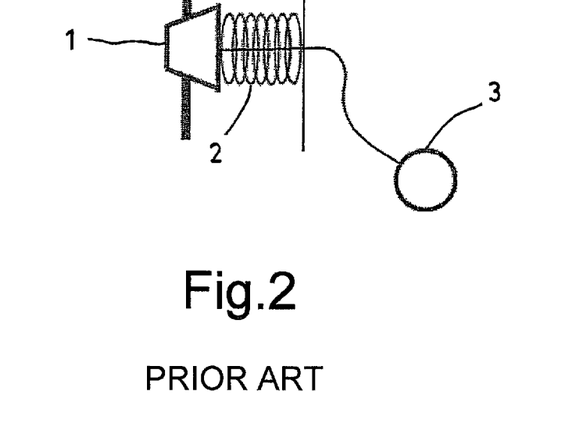
FIG. 2 is a schematic view of a overpressure or relief valve according to the prior art.

In particular, the overpressure or relief valve may be manually activated by the diver in any case there should be an excessive air quantity into the air chamber. A schematic illustration of a typical overpressure or relief valve is shown in FIG. 2. The overpressure or relief valve is provided with a plug 1 configured for obstructing a corresponding hole formed on the wall of the air chamber. The plug 1 is operatively connected to an elastic element or spring 2 whose elastic force is sufficient to maintain the hole closed under the normal operating conditions of the buoyancy compensator device. In the meantime, the elastic force of the elastic element or spring 2 is lower than a threshold value that allows the air outlet when the pressure in the air chamber is too high, or when the diver manually activates the overpressure or relief valve through an appropriate string 3.

The current overpressure or relief valves are thus extremely simple devices, but they are not exempt from any drawbacks. Although the elastic element or spring has been properly calibrated by the buoyancy compensator device manufacturer, it may happen that during the dive the overpressure or relief valves accidentally open making it difficult the ascent of the diver. On the other hand, a non-opening of the overpressure or relief valves under the normal operating conditions of the buoyancy compensator device may cause an overinflation of the air chamber, causing the too quick ascent of the diver.

Well-known overpressure or relief valves are disclosed, for example, in documents WO 2013/178264 A1, U.S. Pat. No. 5,735,504 A and US 2013/255807 A1. All the types of overpressure or relief valves as described in the above documents are nevertheless actuated by hand-operated controls, and they are thus subjected to the above-mentioned drawbacks.

Therefore, it is an aim of the present invention a buoyancy compensator device for underwater use, as well as a related overpressure or relief valve, which is capable to overcome the above-mentioned drawbacks of the prior art in an extremely simple, cheap and particularly functional.

In detail, it is an aim of the present invention to manufacture overpressure or relief valve which allows an automatic control of air outlet from the air chamber of the buoyancy compensator device for underwater use on which such valve is applied.

Another aim of the present invention is to manufacture an overpressure or relief valve which also allows a manual control, by the diver and practicable in parallel with respect to the above-mentioned automatic control, of the air outlet from the air chamber of the compensator device.

This aims according to the present invention are achieved by manufacturing an overpressure or relief valve for a buoyancy compensator device for underwater use as disclosed in claim 1.

Further features of the invention are highlighted by the dependent claims, which are integral part of the present description.

The features and the advantages of a buoyancy compensator device for underwater use and of a related overpressure or relief valve according to the present invention will be more apparent from the following description, exemplifying and not-limiting, referred to the attached schematic drawings in which.

Figure 1:
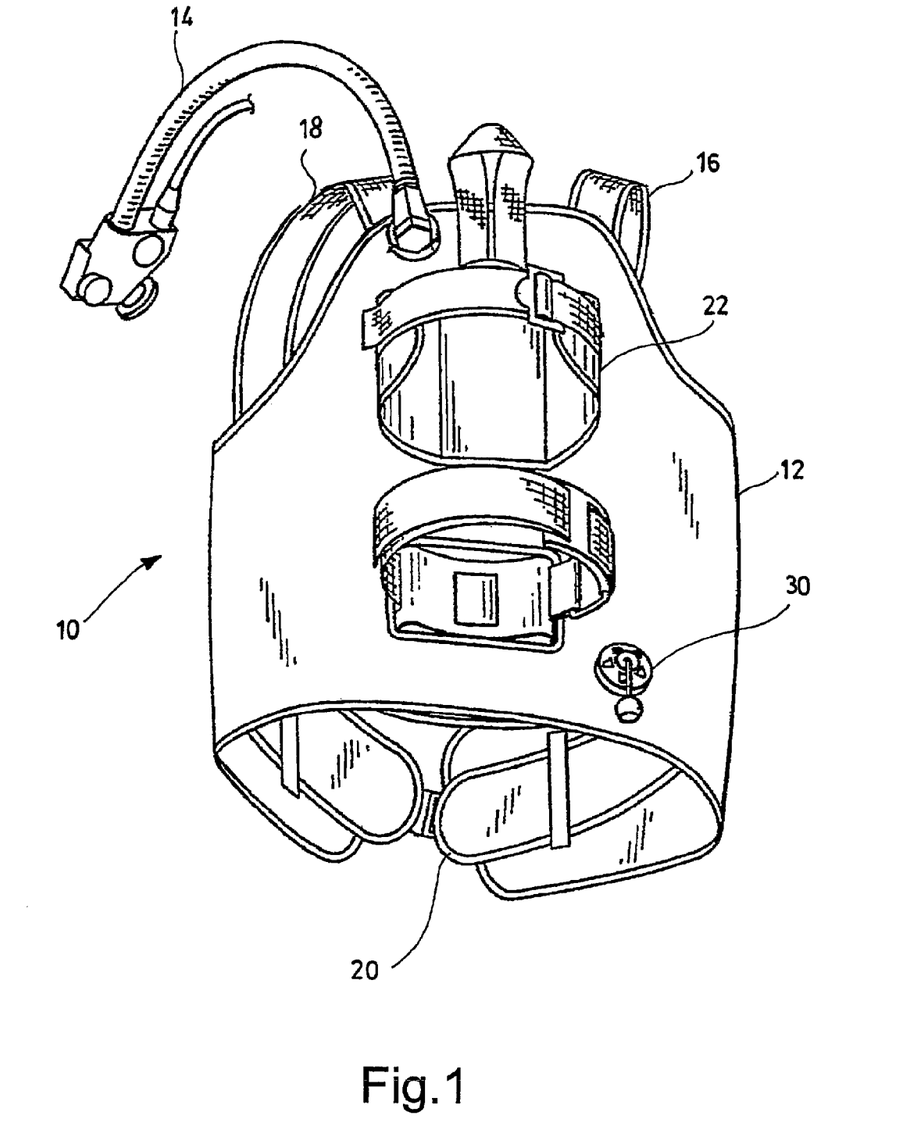
FIG. 1 is a schematic view of a buoyancy compensator device for underwater use on which a overpressure or relief valve according to the present invention may be installed.

With particular reference to FIG. 1, it is shown a buoyancy compensator device for underwater use on which a overpressure or relief valve according to the present invention may be installed. The buoyancy compensator device, generally indicated with the reference number 10, substantially comprises an expandable bag 12 manufactured with a synthetic material and shaped in the form of a jacket. Within the jacket 12 is provided at least one air chamber in which air is supplied through an inflating mechanism 14.

The jacket 12 is thus provided with shoulders 16 and 18 and one or more adjustable straps 20 for the fastening around the body of a diver. The jacket 12 may be also provided with at least one housing 22 for a corresponding tank 70 (FIG. 9) containing air, as well as one or more overpressure or relief valves 30.

Figure 3:
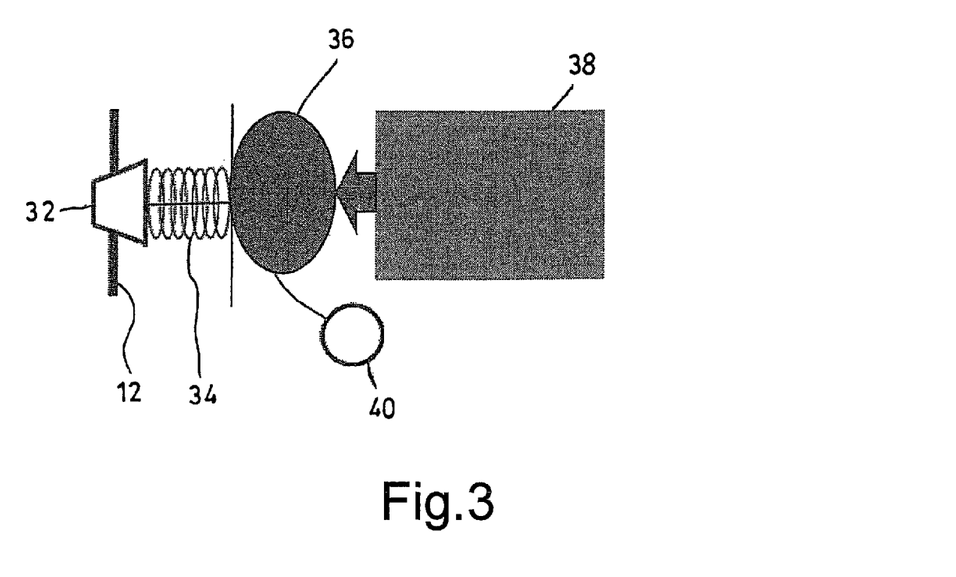
FIG. 3 is a schematic view of a overpressure or relief valve according to the present invention.
Figure 4:
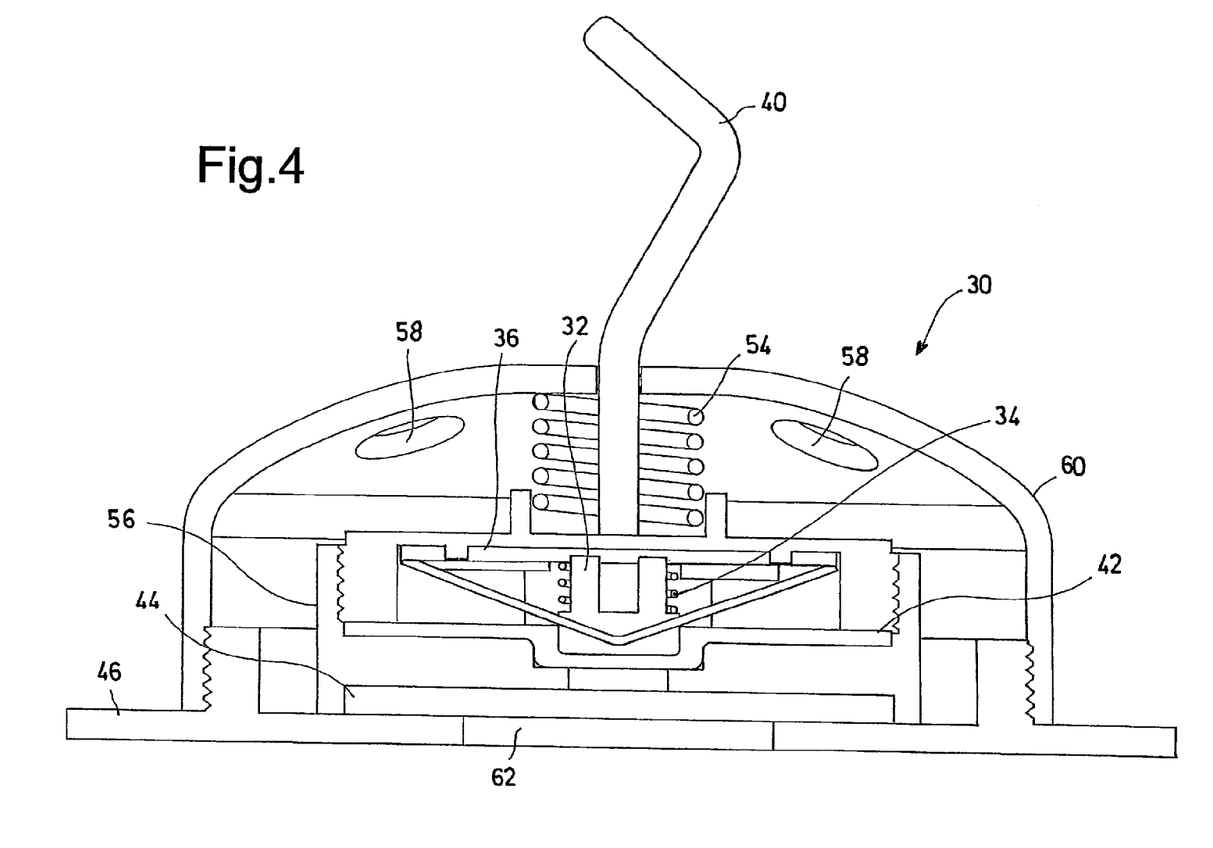
FIG. 4 is a cross-section view of a preferred embodiment example of the overpressure or relief valve according to the present invention.
Figure 5:
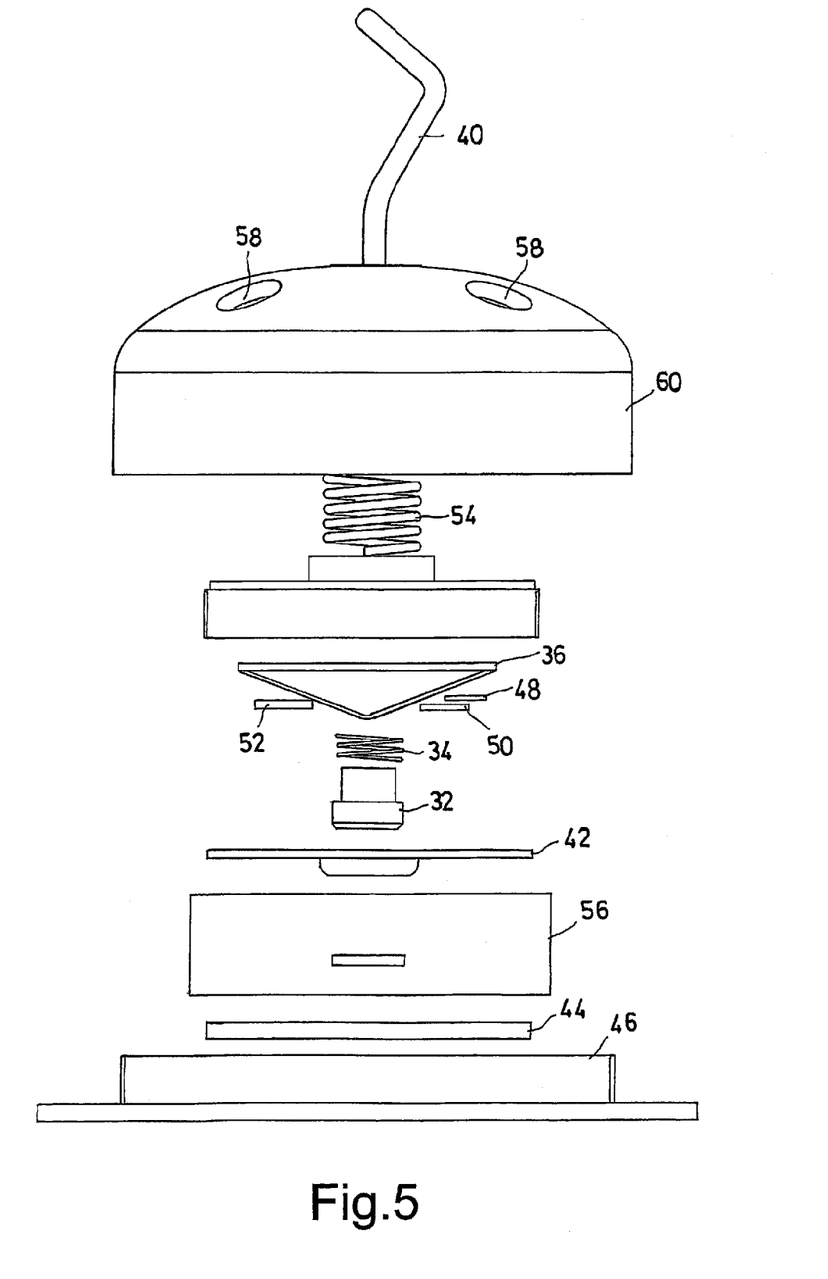
FIG. 5 is an exploded view of the valve of FIG. 4.

Now, with reference to figures from 3 to 5, the main components of a overpressure or relief valve 30 according to the present invention are schematically shown. The valve 30 includes, in a per se known manner, at least one mobile shutter element 32, typically consisting of a plug, configured to occlude, through one or more sealing membranes 42 and 44, at least one correspondent hole 62 obtained on an abutment plate 46 that is configured to be applied on a wall of the air chamber of the jacket 12.

The mobile shutter element 32 is operatively connected to a first end of an elastic element 34, such as, for example, a spiral spring working by compression, whereas a second end of such elastic element 34 is operatively connected to an electric actuator element 36 configured to counteract, in determinated operating conditions of the valve 30, the elastic force of elastic element 34, so as to perform the selective opening and closing of the mobile shutter element 32. Accordingly, the air passage from hole 62 formed on the abutment plate 46 may be allowed or prevented, and then from the inside of air chamber of jacket 12, towards one or more vent through holes 58 obtained on the outer body 60 of the valve 30. The electric actuator element 36 is preferably constituted by at least one component 66 manufactured with a shape memory alloy, but may be electromagnetic, piezoelectric or solenoid.

The overpressure or relief valve 30 therefore comprises an electronic control unit 38 internally provided with one or more sensors 48 configured to detect determined operating conditions of the buoyancy compensator device 10, in particular the operating conditions of the ascent/descent velocity in water. The electronic control unit 38 is further internally provided with a microprocessor unit 50 configured to actuate the electric actuator element 36 and, consequently, to perform the selective opening and closing of the mobile shutter element 32 based on the information retrieved by the sensors.

Preferably sensors 48 may be constituted by pressure sensors, accelerometers or gyroscopes. The electronic control unit 38 may also comprise an electronic compass of the type so called "e-compass". If the electronic control unit 38 is provided with both the electronic compass, and the gyroscope and/or accelerometer sensors 48, the buoyancy compensator device 10 on which the valve 30 is installed may facilitate the underwater explorations, for example, helping the divers in returning to the support boat or to plan route to follow.

The electronic control unit 38 is finally provided with at least one device 52 for generating and/or storing electric energy, typically constituted by a battery, configured to electrically feed all the components of the electronic control unit 38 itself, as well as the electric actuator element 36. The overpressure or relief valve 30 may be also provided with one or more natural charging elements of device 52 for generating and/or for storing electric energy, constituted for example by solar cells. Such natural charging elements are configured to maintain, into the device 52 for generating and/or storing electric energy, a sufficient charge to electrically feed all the components of the electric control unit 38, as well as the electric actuator element 36, in the condition in which such device 52 is disconnected from an external power source.

Both the electric actuator element 36, and the electronic control unit 38 are miniaturized to be incorporated in the body of the valve 30 of a standard sizes, so allowing the valve 30 to maintain the same shape and the same sizes of the overpressure or relief valves of the conventional type. In addition, the assembly constituted by the electric actuator element 36 and the electronic control unit 38 could be also provided as an external accessory to be applied to conventional overpressure or relief valves, so as to automate the functioning and without making any changes to the conventional buoyancy compensator device for underwater use.

Anyway, the valve 30 may be provided with a cord 40 operatively connected to a second elastic element 54 and configured to perform, when actuated by the diver at any moment during the dive, the manual opening of the valve 30 itself, acting on the mobile shutter element 32 or on a second mobile shutter 56 suitably dedicated to the manual control. Also the second elastic element 54 is preferably constituted by a spiral spring working by compression. Both the automatic and the manual control of valve 30 may be simultaneously carried out depending on the necessity. The presence of a second mobile shutter 56, configured to occlude the hole 62, allow to carried out manually the air vent regardless of the electric actuator element 36 functioning, ensuring greater security to the diver.

Figure 6:
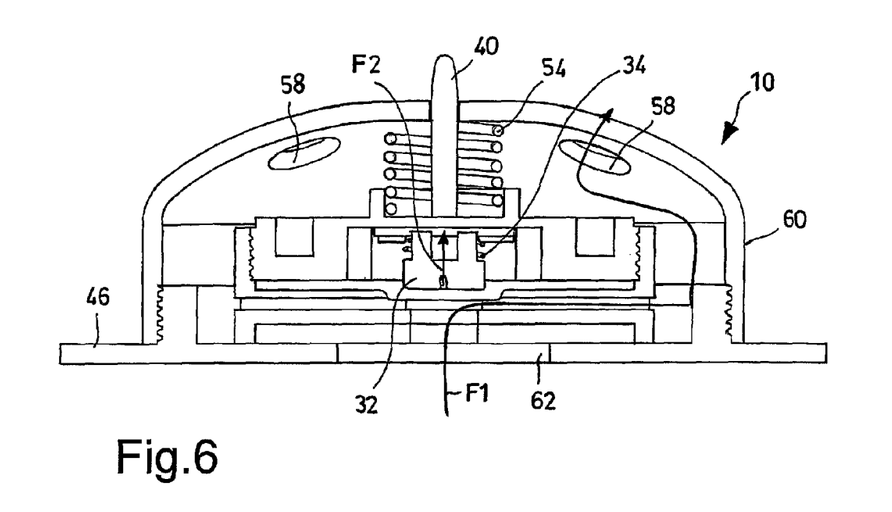
FIGS. 6 and 7 schematically show two respective operating modes of the valve of FIG. 4.

Operationally, the valve 30 may be manually activated by the diver before diving, or it may automatically actuate when the diver enters into water. Therefore, the automatic deactivation may happen when the diver gets out of the water. The automatic activation mode of valve 30 is shown in FIG. 6, where such valve 30 is illustrated with the mobile shutter element 32 opened by the correspondent electric actuator element 36. The air path from hole 62 obtained on the abutment plate 46, and therefore from inside of the air chamber of jacket 12, towards the relief hole 58 obtained on the external body 60 of valve 30 is indicated by the arrow F1. Instead, the arrow F2 indicates the run, and therefore the opening, of the mobile shutter element 32.

Figure 7:
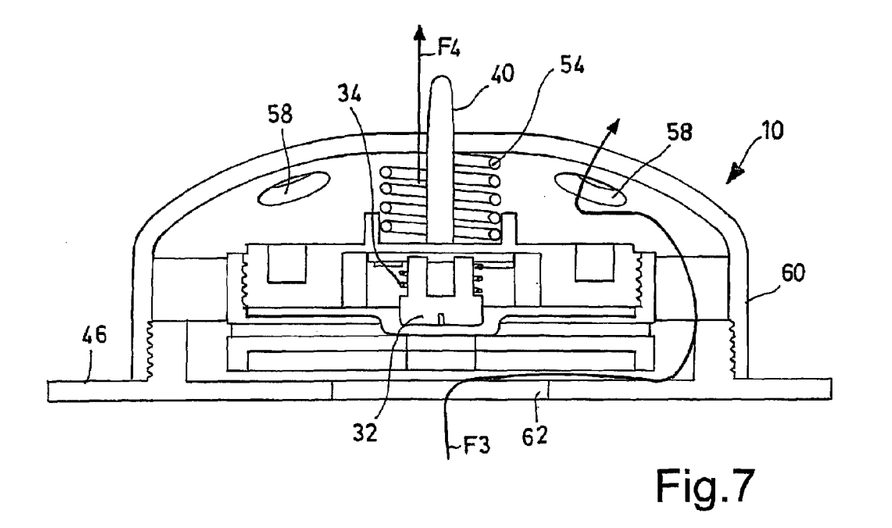

Instead, FIG. 7 shows the manual activation mode of valve 30, when such valve 30 is illustrated with the second mobile shutter 56 opened by the cord 40. In this case the air path from hole 62 obtained on abutment plate 46, and thus from inside of the air chamber of jacket 12, towards relief holes 58 obtained on the external body 60 of valve 30 is indicated by arrow F3. Instead, the arrow F4 show the movement direction of cord 40.

Figure 8:
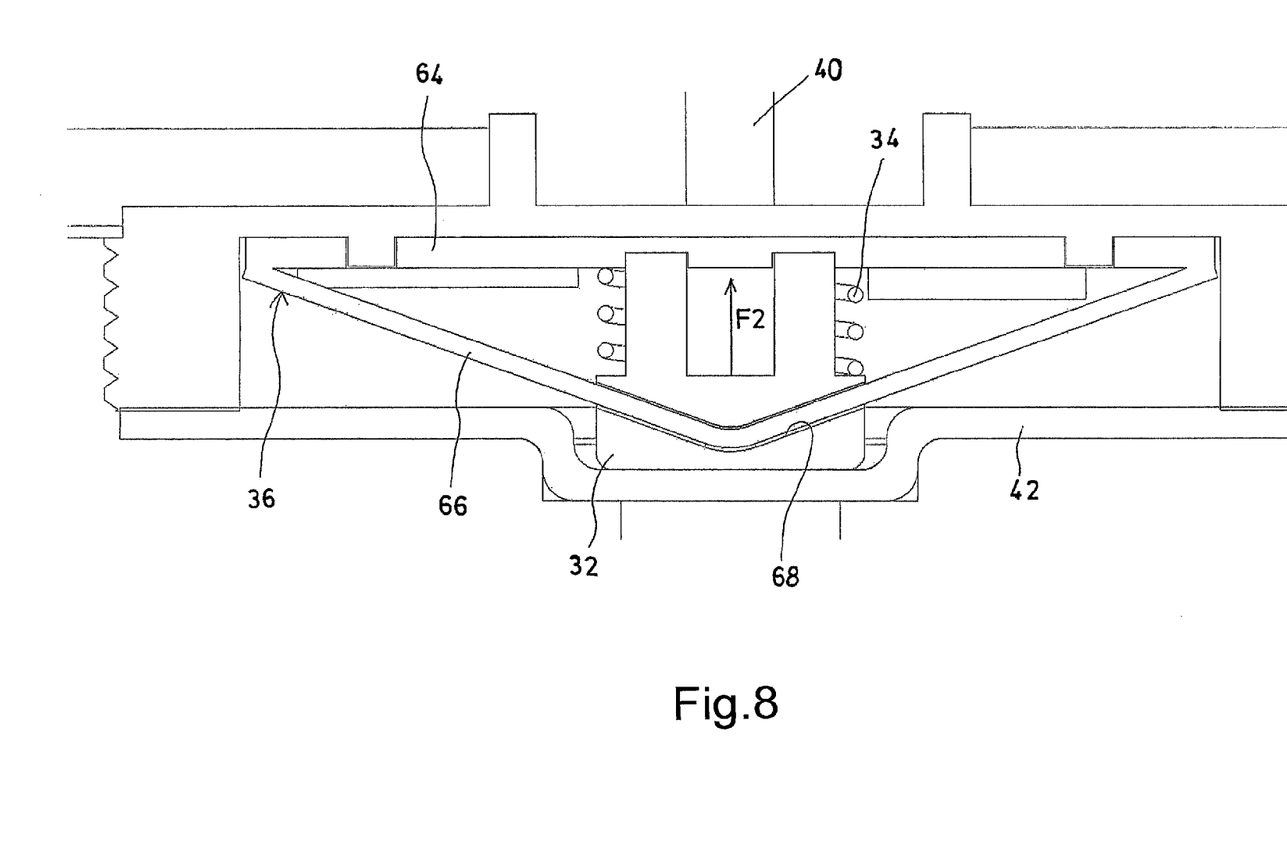
FIG. 8 shows a enlarged particular of the valve of FIG. 4.

With reference to FIG. 8, is shown a preferred embodiment example of the interaction between the mobile shutter element 32, the elastic element 34 and the sealing membrane 42. The mobile shutter element 32 is simply placed in abutment on the sealing membrane 42, that is kept closed by the force exerted by the elastic element 34 on such mobile shutter element 32. When the electric actuator element 36 is activated as a result of the electrical current, it contracts and drags the mobile shutter element 32 along the movement direction indicated by arrow F2, counteracting the action of the elastic element 34. This movement removes the mobile shutter element 32 from the respective sealing membrane 42, that will result thus without loads burdening on it. Accordingly, the sealing membrane 42 will open the hole 62 by effect of the air pressure contained inside the jacket 12.

The electric actuator element 36 may be constituted by a printed circuit 64 ("printed circuit board" or PCB) on which is fixed the component 66 manufactured with a shape memory alloy. In the detail, the component 66 manufactured with a shape memory alloy may be constituted by a "V"-shaped wire through mechanic crimping. The wire 66 may be made integral with the mobile shutter element 32 by the insertion into a correspondent housing 68, also the latter being "V"-shaped and formed in such mobile shutter element 32, as shown for example in FIG. 8.

Figure 9:
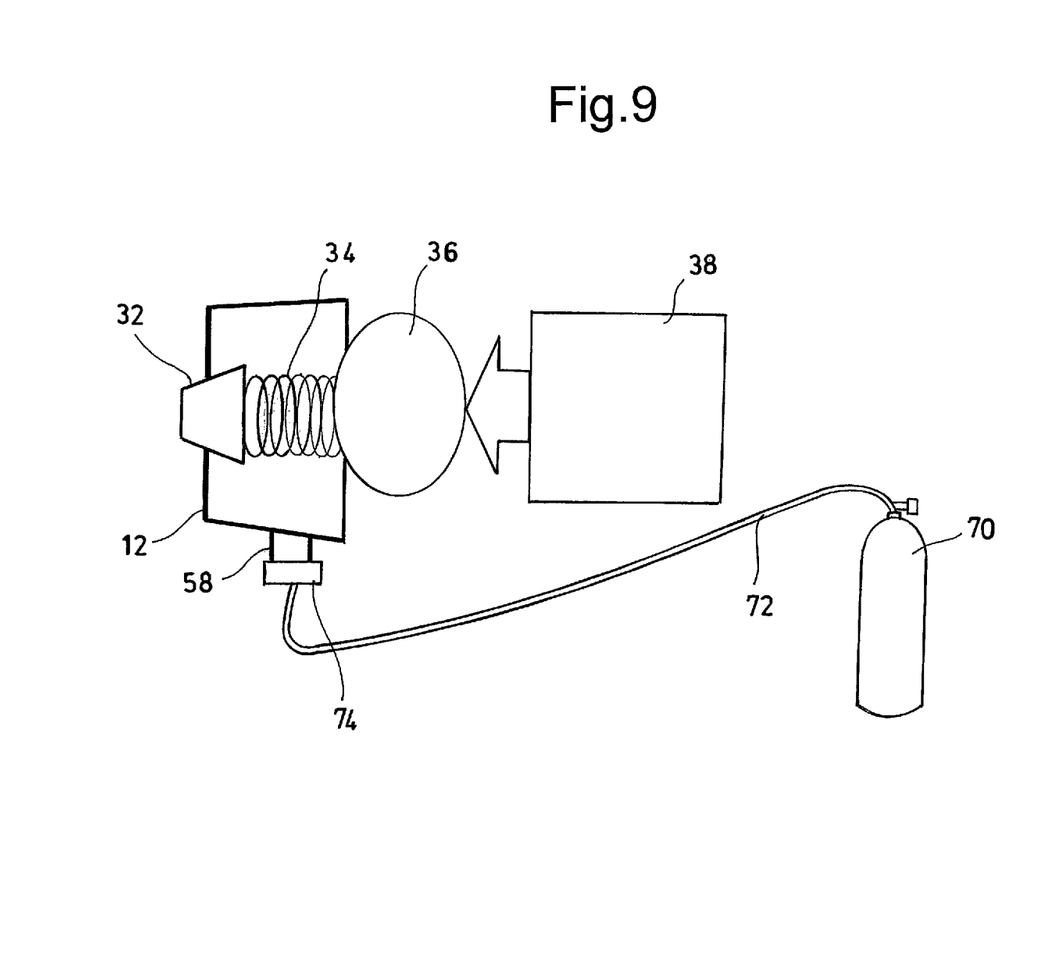
FIG. 9 shows an embodiment example wherein the valve according to the present invention operates as depth control valve.

With reference to FIG. 9, it is shown an embodiment example in which the valve 30 according to the present invention works as depth control valve. Indeed, in order to increase diver's security, the buoyancy compensator device 10 may be provided with at least one depth control valve that may be both integrated into the overpressure or relief valve, and provided as independent valve. The depth control valve 30 is configured to blow pressure air, coming from tank 70, in the jacket 12. This operation, carried out at a predefined depth is operated by the control electronic unit 38, impedes the divers to descent at depths greater than such predetermined depth. If the buoyancy compensator device 10 is provided both of at least one relief or overpressure valve, and at least one depth control valve, the diver would have the possibility both to control the ascent to the surface, carrying out a correct decompression, and to limit the descending in-depth.

In detail, the depth control valve 30 may limit the descent velocity of the diver or the maximum reachable depth depending on parameters detected by sensors 48 and elaborated by the electric control unit 38. The depth control valve 30 may be manually activated by the diver before diving, or it may be automatically activated at the moment of the diving. The through holes 58 of the depth control valve 30, instead of being relief holes, they are inlet holes of pressure air coming from the tank 70 through a suitable tubing 72. Each inlet hole 58 is then provided with a closing membrane 74, actuated by the electric actuator element 36 depending on signals generated by the control electronic unit 38.

Therefore, it has been shown that the overpressure or relief valve for a buoyancy compensator device for underwater use according to the present invention achieve the aims previously highlighted.

The overpressure or relief valve for a buoyancy compensator device for underwater use of the present invention thus conceived is susceptible in any case of numerous modifications and variants, all falling within the same inventive concept; moreover all the details are replaceable by technically equivalent elements. Practically, the materials used, as well as forms and sizes, may be whatever depending on the technical requirements.

The scope of protection of the invention is therefore defined by the attached claims.

The invention claimed is:

1. An overpressure relief valve for a buoyancy compensator device for underwater use of the type comprising an expandable bag internally provided with at least one air chamber, the valve comprising at least one first mobile shutter element configured to occlude at least one corresponding hole formed on an abutment plate that is configured to be applied on a wall of said air chamber, said first mobile shutter element being operatively connected to a first end of a first elastic element, whereas a second end of said first elastic element is in turn operatively connected to an actuator element, wherein said actuator element is an electric actuator element, actuated by an electrical current and configured to counteract, in certain operating conditions of the valve, the elastic force of said first elastic element, so as to perform the selective opening and closing of the first mobile shutter element and, consequently, respectively allow or prevent air from said hole, and then from the inside of said air chamber, from passing towards one or more through holes formed on the outer body of the valve and vice versa, wherein the electric actuator element comprises at least one component manufactured with a shape memory alloy, and wherein the electric actuator element comprises a printed circuit on which said at least one component manufactured with the shape memory alloy is fixed, said at least one component manufactured with the shape memory alloy being constituted by a shaped wire and made integral with said at least one first mobile shutter element.

2. The valve according claim 1, comprising an electronic control unit internally provided with one or more sensors configured to detect certain operating conditions of the buoyancy compensator device, said electronic control unit also being internally provided with a microprocessor unit configured to actuate the electric actuator element and, consequently, to perform the selective opening and closing of the first mobile shutter element based on the information from said sensors.

3. The valve according to claim 2, wherein said sensors are selected from the group consisting of pressure sensors, accelerometers and gyroscopes.

4. The valve according to claim 2, wherein the electronic control unit comprises an electronic compass.

5. The valve according to claim 2, wherein the electronic control unit is provided with at least one device for generating and/or storing electric power, configured for electrically powering all components of said electronic control unit, as well as the electric actuator element.

6. The valve according to claim 5, it comprising one or more natural power supply elements of the device for generating and/or storing electric power, said natural power supply elements being configured to maintain in said device for generating and/or storing electric power a charge sufficient to electrically power all components of the electronic control unit, as well as the electric actuator element, under the condition in which said device for generating and/or storing electric power is disconnected from any external power supply.

7. The valve according to claim 2, wherein said one or more through holes are inlet holes of pressure air and are provided with a respective closing membrane, actuated by the electric actuator element depending on signals generated by the control electronic unit and depending on parameters detected by said sensors.

8. The valve according to claim 1, comprising a cord operatively connected to a second elastic element and configured to perform, when actuated by a diver at any time during the dive, the manual opening of a second mobile shutter configured to occlude said at least one hole formed on said abutment plate.

9. The valve according to claim 8, wherein the first elastic element and the second elastic element are made up of respective coil springs operating by compression.

10. A buoyancy compensator device for underwater use, comprising an expandable bag internally provided with at least one air chamber, and comprising at least one overpressure relief valve according to claim 1.

11. The device according to claim 10, comprising at least one housing for a corresponding tank containing air, wherein said at least one valve is operatively connected to said tank through a tubing to blow pressure air in said expandable bag, under determined operating conditions of the device, in order to impede to the user of said device to descend to greater depths than a predetermined depth.

* * * * *